United States Patent [19]

Kathel

[11] Patent Number: 4,739,653
[45] Date of Patent: Apr. 26, 1988

[54] PRESSURE GAUGE

[75] Inventor: Badri P. Kathel, Dehra Dun, India

[73] Assignee: Oil and Natural Gas Commission-India, Dehra Dun, India

[21] Appl. No.: 875,768

[22] Filed: Jun. 16, 1986

[51] Int. Cl.⁴ ............................................. E21B 47/00
[52] U.S. Cl. ...................................... 73/151; 73/712; 73/742; 346/125; 346/33 TP
[58] Field of Search ................. 73/151, 152, 711, 712, 73/742; 346/138, 136, 33 WL, 33 TP, 127, 79, 125; 364/422, 580

[56] References Cited

U.S. PATENT DOCUMENTS

| 2,265,098 | 12/1941 | Bettis | 73/151 |
| 2,942,462 | 6/1960 | Buck | 73/152 |
| 3,232,115 | 2/1966 | Bennett et al. | 73/152 |
| 3,732,728 | 5/1973 | Fitzpatrick | 73/151 |
| 4,161,782 | 7/1979 | McCracken | 73/154 |
| 4,224,628 | 9/1980 | Murray | 346/76 PH |
| 4,570,234 | 2/1986 | Baack | 346/33 WL |

*Primary Examiner*—Stewart J. Levy
*Assistant Examiner*—Kevin D. O'Shea
*Attorney, Agent, or Firm*—B. K. Niyogi

[57] ABSTRACT

This invention relates to a sub surface pressure gauge comprising an axially displaceable drum with a chart disposed within a housing and having a selective axial movement, rotatable stylus for recordal of pressures on said chart provided on said drum. A motor actuates the drum through a programmable switch, the output shaft of said motor providing for linear displaceable movement of the drum controlled by said switch.

9 Claims, 6 Drawing Sheets

PRIOR ART

PRESSURE GAUGE

FIELD OF INVENTION

This invention relates to a sub surface pressure gauge for monitoring reservoir pressures in on and off shore oil wells. In particular, this invention relates to the clock mechanism provided in such sub surface pressure gauges.

PRIOR ART

Sub surface pressure gauges normally comprise a mechanical clock having a gear train and a balance wheel receiving an actuation by the unwinding action of of a spring. The unwinding movement of the spring causes an linear/axial movement of a drum through a lead screw/straight shaft, a paper or metallic chart provided on the inner surface of said drum. The entire length of the drum is traversed within the measurement cycle. The sub surface pressure gauge further comprises bourdon or pressure tube for actuating a stylus to provide a recording of the pressure on said drum. It is known that the rotation of the bourdon tube is directly proportional to the pressure applied thereto and, whereby, the movement of the stylus corresponds to such pressure. Such a pressure reading is recorded against time provided by an axial/linear displacement of the drum.

Several distinct disadvantages are associated with a sub surface pressure gauge having a mechanical clock for imparting an axial/linear movement to the drum. One such distinct disadvantage is that the drum has a continuous movement in distinction to a selective movement. As an unwinding of the spring is a continuous action, and the drum receives a movement by such a continuous unwinding action of the spring, it would be apparent that a selective or programmable movement cannot be imparted to the drum. An absence of a selective or programmable movement to the drum imposes limitations on the quality of the pressure readings on the drum. Furthermore, and due to such a continuous movement of the drum, it was not possible to obtain a sample pressure readings for those periods considered as pertinent or critical periods.

It is generally known that sub surface pressure gauges are retained under the sub surface over a considerable period of time. As the drum is in a constant state of movement, a recording of the pressure on the drum is effected from the time of introduction of the gauge into the sub surface to the time of withdrawal. Thus, and if such a period as by way of example is 200 hours, and the chart length is only 5″, the pressure for the complete period of 200 hours is crowded into a chart length of only 5″. Accordingly, a fine resolution of the pressure readings with reference to time cannot be obtained. Further, a pressure reading for any specific period or time is not easily identifiable and retrievable in reference to time. Thus, such readings mainly provided a pressure behavious rather than a pressure reading in reference to a specific time.

Normally, the pressure readings in the initial stages are more critical and important in comparison to the latter period when such a pressure is normally stabilized. Thus, and as the drum is in a continuous state of movement, sufficient pressure readings only for the initial period could not be sampled.

Reference to sampling or sample period used herein are intended to imply those periods where the pressure reading with reference to time should be of a good resolution, and that the pressure at any specific time during such a sample period can be easily identified and read from the chart.

Yet another disadvantage is a wastage of the chart space during the period firstly when the gauge is being lowered to the required depth and secondly, during the period that the gauge is being raised to the surface. It would be apparent that during such periods, a pressure reading is not required. However, and as the drum was in constant state of movement, space of chart during such periods could not be avoided.

Still further disadvantage is with regard to the static bottom hole pressure and where the pressure builds up by closing of the well. In accordance with the known art, a certain interval of time is required so as to provide a recognizable reading of the static bottom hole pressure. Once again, as the drum is in a constant state of movement, a recording was effected even during the interval of time.

Such disadvantages are now obviated by the sub surface pressure gauge of the present invention having a novel construction of a clock for driving the drum.

OBJECTS OF THE INVENTION

Accordingly, a primary object of the present invention is to propose a sub surface pressure gauge having an improved construction of a clock.

Another object of this invention is to propose a sub surface pressure gauge which obviates the disadvantages referred to hereinabove.

SCOPE OF THE INVENTION

According to this invention there is provided a sub surface pressure gauge comprising a housing having a moveable drum with a chart provided therewith, a member for imparting a movement to a stylus for recordal of pressures on said chart, a motor adapted to be connected to a power source through a programmable switch, the output shaft of said motor imparting a selective and programmable drive to said drum.

The sub surface pressure gauge comprises a housing with a moveable drum disposed therein, a chart provided with said drum. A stylus coacts with said chart, said stylus receiving a drive from a member such as a bourdon tube. Such features of a sub surface pressure gauge are known in the art.

Specifically in accordance with the present invention programmable means are provided for selectively driving the drum. Such programmable means comprise a micro processor connected to a motor drive circuit, the motor connected to a power source through said motor drive circuit.

DESCRIPTION OF INVENTION WITH REFERENCE TO DRAWINGS

Further objects and advantages of this invention will be more apparent from the ensuing description when read in conjunction with the accompanying drawings and wherein.

Figure 1A:
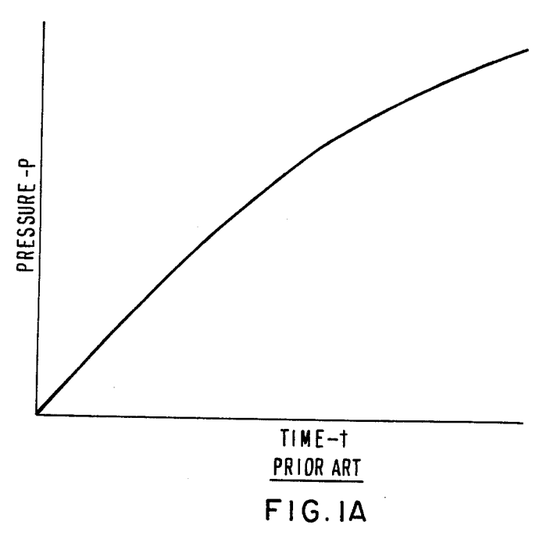
FIGS. 1A and 1B: shows a pressure recording in accordance with the mechanical clock of the prior art and present invention respectively.

FIG. 1A shows a recorded chart of approximately five inches length intended for a period of, for example 40 hours. The clock is retained in the sub surface for 40 hours and as the drum is in a constant state of movement, the recording for the complete period is effected over a chart having a length of only 5". Several distinct disadvantages are associated with the known construction of a clock. One such disadvantage is that as the drum is in a continuous state of movement, the resolution is poor which increases in proportion with increase in time. Yet another disadvantage is that the recording for the complete period that the gauge is in the sub surface is contained on a 5" chart length and, whereby, the readings for any particular time instance does not possess a good resolution and the pressure for that time period is not easily identifiable.

Figure 1B:
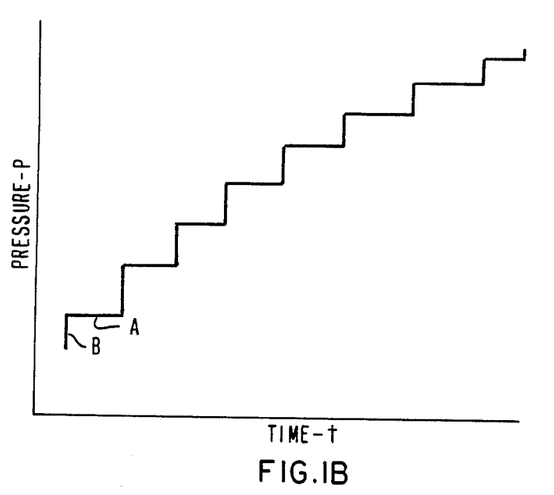

Reference is made to FIG. 1B which shows a recorded chart by the pressure gauge of the present invention, and where the chart has the same length of 5" and for a recording period of 40 hours. As shown in FIG. 1A, the pressure rises rapidly in the initial period and thereafter becomes substantially constant. Thus, one of the critical periods for determination and recording of the pressure is the initial period, which forms the sampling period and that the readings for the sampling period should have a fine resolution. As the drum of the present invention has a selective movement, the drum has a drive only after specified intervals of time and such as to provide a dwell period A and a drive period B. Thus, and as apparent from FIG. 1B, the readings, during the sample period have a fine resolution. Upon completion of the sample period, the dwell period A can progressively increase and is similarly shown in FIG. 1B.

Figure 2A:
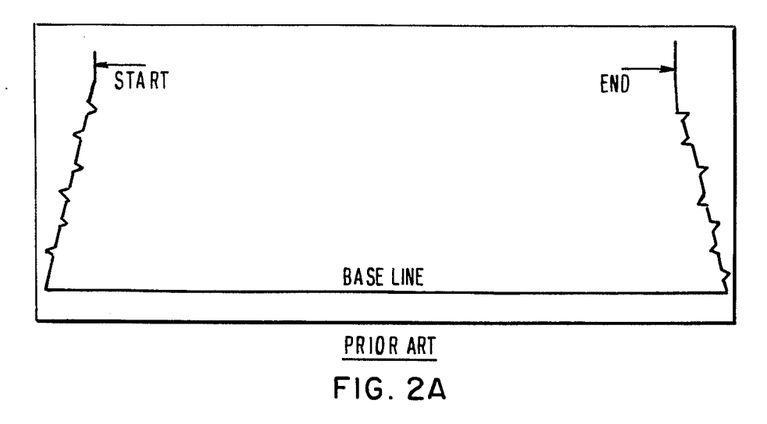
FIGS. 2A and 2B: shows a start and end of a recording in accordance with the gauge of the prior art and present invention respectively.
Figure 2B:
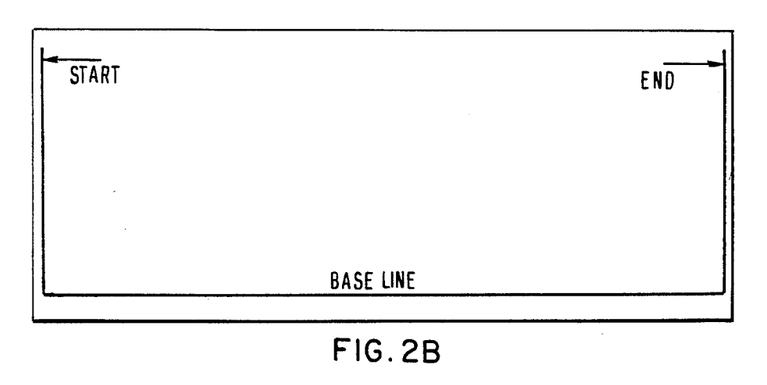

Reference is now made to FIG. 2A which shows the start and end of a recording. As the drum of the known art has a continuous rotation, a recording is effected even during the period of introduction and withdrawal of the gauge. As such recordings are not required, there is wastage of the chart. Such a wastage of the chart space is a distinct disadvantage, particularly where the total recording duration is large. Such a disadvantage is obviated by the pressure gauge of the present invention, and where a recording is effected only upon the chart reaching the predetermined depth, and as shown in FIG. 2B. Similarly, the recordings turminates upon withdrawal of the gauge and, whereby there is no wastage of the chart.

Figure 3A:
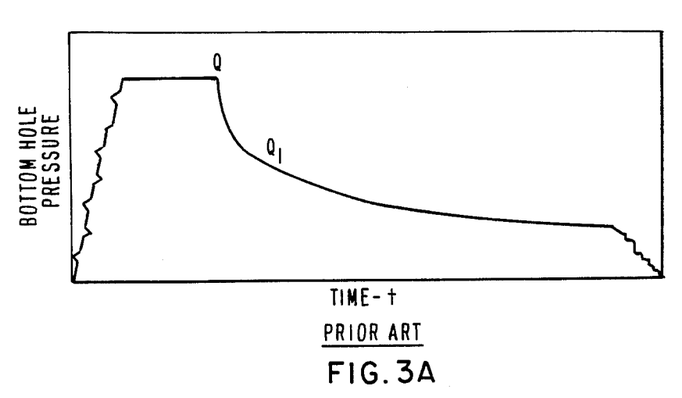
FIGS. 3A and 3B: shows a recording for the pressure draw down testing in accordance with the gauge of the prior art and present invention respectively.
Figure 3B:
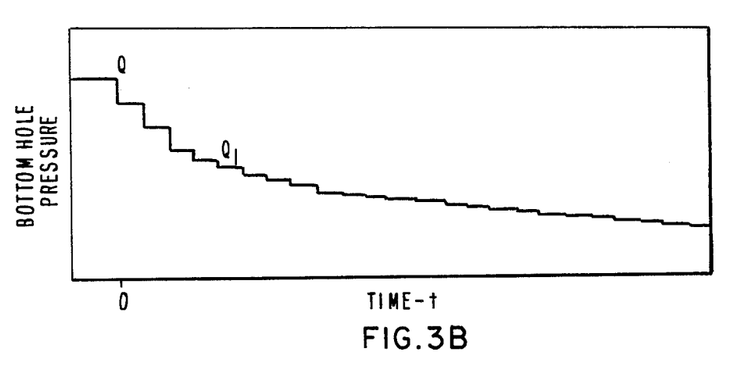

Reference is now made to FIG. 3A which shows a graph for pressure draw down testing in accordance with the gauge of the prior art. As shown from FIG. 3A, the pressure drops rapidly from time Q to $Q_1$ and thereafter, the pressure fall is gradual. However, the pressure at any specific period during time Q to $Q_1$ is not easily identifiable from the graph of FIG. 3A. In distinction, FIG. 3B shows the graph by the gauge of the present invention and the pressure at any instance during time Q to $Q_1$ can be identified. Furthermore, there is a complete utilization of the chart space in distinction to only a 50% utilization of the chart space of FIG. 3A. Such advantages are derived by the pressure gauge of the present invention as the speed of the drum is variable in comparison to the drum of the prior art having a constant speed.

Though not shown in the drawings, similar advantages are derived by the gauge of the present invention in measuring build up pressures, or any other related studies related to gauge.

Figure 4:
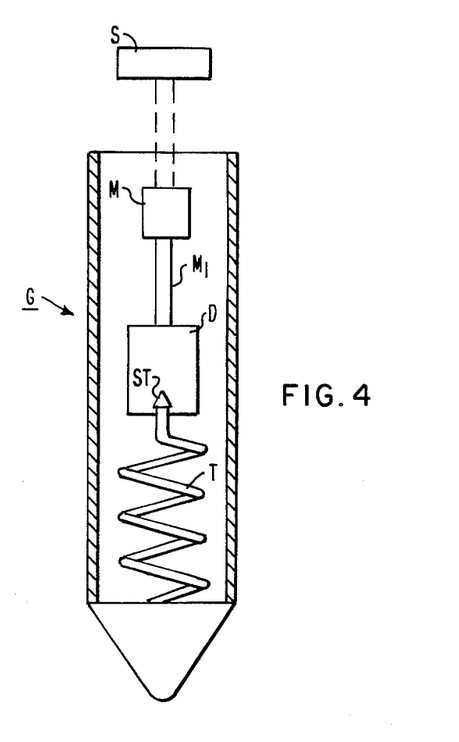
FIG. 4: shows the pressure gauge of the present invention.

The gauge G of the present invention comprises an elongate housing H with a linearly displaceable chart drum D disposed therein. A bourdon tube T is provided with gauge G, a stylus ST connected to said tube. An actuation to stylus ST, in proportion to the pressure, is imparted by bourdon tube T. Such features are known in the art.

Specifically in accordance with the present invention, and referring to FIG. 4, the output shaft $M_1$ of a motor M is coupled to and drives drum D and such that the latter has a linear movement. Any suitable and known means may be provided for converting the rotational movement of shaft $M_1$ to a linear movement of drum D. Motor M is connected to a power source (not shown) through a programmable switch S. Thus, and only in the presence of a command signal, motor M is connected to the power source and linearly drives drum D. The purpose of programmable switch S is to selectively drive motor M. For this purpose, and reverting to the sample period of FIG. 1B drum D is programmed to move only after an interval of time for example, every ten minutes and is in a state of movement at each interval only for a very small specified period. Thus, and as shown in FIG. 1B, there is a dwell period A and where drum D is not in a state of movement. During such a dwell period, only stylus ST is in a state of movement. After each dwell period, drum D has a linear movement and a recording B is effected. It would be apparent for any desired period required to be sampled, such as the first hour, a recording of the sample period is effected in the manner as shown in FIG. 1B. Thus, for the sample period, a clear and distinct reading of the pressure is effected in distinction to that of FIG. 1A and where it is not possible to effect a reading for the sample period.

Figure 5:
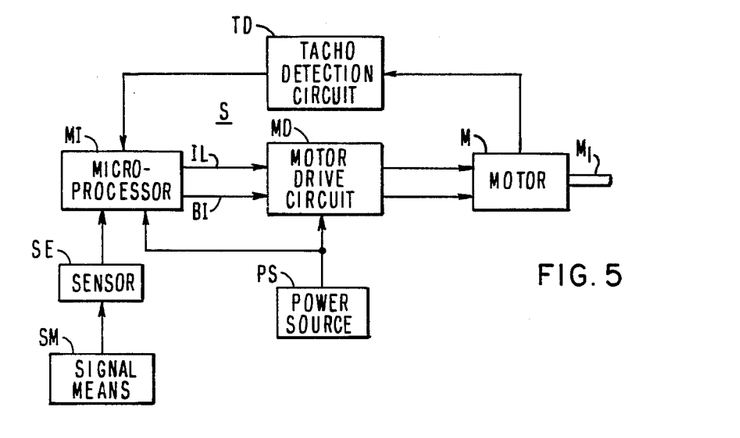
FIG. 5: shows a block diagram of the circuit of the programmable switch.

Programmable switch S of FIG. 5 comprises a microprocessor MI adapted to receive programming signals. Microprocessor MI distinguishes and identifies the signals decodes the sampling program from the signals and generates a switching sequence to a motor drive circuit MD. Thus, when motor drive circuit MD is in a state of actuation, motor M is connected to a power source PS. Microprocessor MI receives a command signal from a signal means SM and depending upon such a signal, motor M is connected to the power source. Signal means SM may comprise of a monochromatic light source, such as a light emitting diode, which is sensed by a sensor SE. In the presence of such a light signal, sensor SE conducts and passes the signal to microprocessor MI. Microprocessor MI recognizes and identifies the signals, and depending upon the nature of the signal, a signal is passed to microprocessor MI. Microprocessor MI is duly programmed by a programmer (not shown).

Once motor M is actuated, microprocessor MI then goes to the next state of monitoring said motor through a tacho detection circuit TD. Tacho detection circuit TD detects the movement of motor M and converts it into digital level pulses, which is applied to microprocessor MI. Such pulses are counted by microprocessor MI, and when the count equals the programmed count, it breaks supply to motor drive circuit MD. For this purpose, besides the input line IL provided between microprocessor MI and drive circuit MD, a break input line BI is provided therebetween. Thus, when the digital level pulse counts equal the programmed counts, a brake signal is applied by microprocessor MI through brake line BI, and the output terminals of motor drive circuit MD are shorted.

As would be apparent, a selected drive is imparted to drum D through motor M and programmable switch S. Reference made hereinabove is to a selective drive for only the initial period which is the sampling period. However, such a reference was only by way of an exemplary embodiment, in that a selective drive may be imparted to drum D for any other period or for the complete period of recording. In this respect, one typical example is shown in Table 1 herein.

TABLE - 1

| S. NO | HRS | MIN | SEC | S. NO | HRS | MIN | SEC | S. NO | HRS | MIN | SEC | S. NO | HRS | MIN | SEC |
|---|---|---|---|---|---|---|---|---|---|---|---|---|---|---|---|
| 1 | 0 | 1 | 30 | 26 | 0 | 42 | 0 | 51 | 1 | 32 | 0 | 76 | 2 | 22 | 0 |
| 2 | 0 | 3 | 0 | 27 | 0 | 42 | 0 | 52 | 1 | 34 | 0 | 77 | 2 | 24 | 0 |
| 3 | 0 | 4 | 30 | 28 | 0 | 46 | 0 | 53 | 1 | 36 | 0 | 78 | 2 | 26 | 0 |
| 4 | 0 | 6 | 0 | 29 | 0 | 48 | 0 | 54 | 1 | 38 | 0 | 79 | 2 | 28 | 0 |
| 5 | 0 | 7 | 30 | 30 | 0 | 50 | 0 | 55 | 1 | 40 | 0 | 80 | 2 | 30 | 0 |
| 6 | 0 | 9 | 0 | 31 | 0 | 52 | 0 | 56 | 1 | 42 | 0 | 81 | 2 | 33 | 30 |
| 7 | 0 | 10 | 30 | 32 | 0 | 54 | 0 | 57 | 1 | 44 | 0 | 82 | 2 | 37 | 0 |
| 8 | 0 | 12 | 0 | 33 | 0 | 56 | 0 | 58 | 1 | 46 | 0 | 83 | 2 | 40 | 30 |
| 9 | 0 | 13 | 30 | 34 | 0 | 58 | 0 | 59 | 1 | 48 | 0 | 84 | 2 | 44 | 0 |
| 10 | 0 | 15 | 0 | 35 | 1 | 0 | 0 | 60 | 1 | 50 | 0 | 85 | 2 | 47 | 30 |
| 11 | 0 | 16 | 30 | 36 | 1 | 2 | 0 | 61 | 1 | 52 | 0 | 86 | 2 | 51 | 0 |
| 12 | 0 | 18 | 0 | 37 | 1 | 4 | 0 | 62 | 1 | 54 | 0 | 87 | 2 | 54 | 30 |
| 13 | 0 | 19 | 30 | 38 | 1 | 6 | 0 | 63 | 1 | 56 | 0 | 88 | 2 | 58 | 0 |
| 14 | 0 | 21 | 0 | 39 | 1 | 8 | 0 | 64 | 1 | 58 | 0 | 89 | 3 | 1 | 30 |
| 15 | 0 | 22 | 30 | 40 | 1 | 10 | 0 | 65 | 2 | 0 | 0 | 90 | 3 | 5 | 30 |
| 16 | 0 | 24 | 0 | 41 | 1 | 12 | 0 | 66 | 2 | 2 | 0 | 91 | 3 | 8 | 30 |
| 17 | 0 | 25 | 30 | 42 | 1 | 14 | 0 | 67 | 2 | 4 | 0 | 92 | 3 | 12 | 0 |
| 18 | 0 | 27 | 0 | 43 | 1 | 16 | 0 | 68 | 2 | 6 | 0 | 93 | 3 | 15 | 30 |
| 19 | 0 | 28 | 30 | 44 | 1 | 18 | 0 | 69 | 2 | 8 | 0 | 94 | 3 | 19 | 0 |
| 20 | 0 | 30 | 0 | 45 | 1 | 20 | 0 | 70 | 2 | 10 | 0 | 95 | 3 | 22 | 30 |
| 21 | 0 | 32 | 0 | 46 | 1 | 22 | 0 | 71 | 2 | 12 | 0 | 96 | 3 | 26 | 0 |
| 22 | 0 | 34 | 0 | 47 | 1 | 24 | 0 | 72 | 2 | 14 | 0 | 97 | 3 | 29 | 30 |
| 23 | 0 | 36 | 0 | 49 | 1 | 26 | 0 | 73 | 2 | 16 | 0 | 98 | 3 | 33 | 0 |
| 24 | 0 | 38 | 0 | 49 | 1 | 28 | 0 | 74 | 2 | 18 | 0 | 99 | 3 | 36 | 30 |
| 25 | 0 | 40 | 0 | 50 | 1 | 30 | 0 | 75 | 2 | 20 | 0 | 100 | 3 | 40 | 0 |

Figure 6:
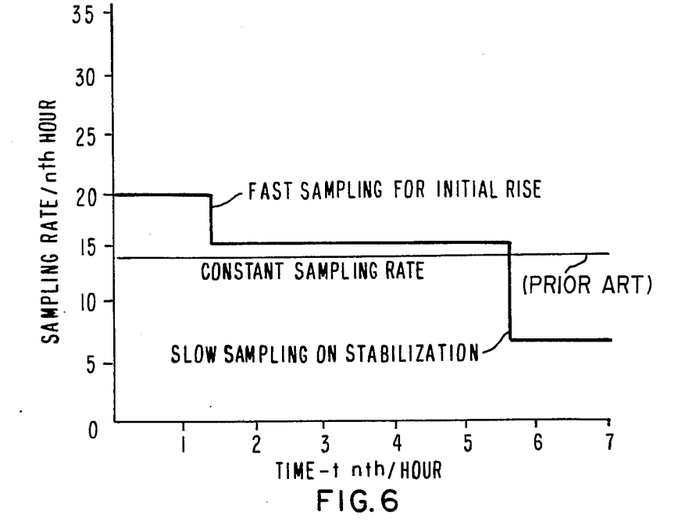
FIGS. 6 and 7: shows a sampling rate with respect to the gauge of the known art and present invention.

The sampling rate with respect to the time is shown in FIG. 6 with respect to the gauge of the present invention (Table 1) and that of the prior art. It would be apparent that the graph for the gauge of the prior art is a straight line in that a sampling period cannot be provided. The graph for the sampling rate for the gauge of the present invention shows a fast sampling in the initial period, namely after every 90 seconds. This is required as the pressure increases in the initial period. Thereafter, and once the pressure gradually stabilizes, a sampling is effected after every 120 seconds and, finally, after every 240 seconds.

Table 2 herein shows a continuous varying sampling rate

TABLE - 2

| S. NO | HRS | MIN | SEC | S. NO | HRS | MIN | SEC | S. NO | HRS | MIN | SEC | S. NO | HRS | MIN | SEC |
|---|---|---|---|---|---|---|---|---|---|---|---|---|---|---|---|
| 1 | 0 | 0 | 5 | 26 | 0 | 27 | 10 | 51 | 1 | 46 | 20 | 76 | 3 | 57 | 35 |
| 2 | 0 | 0 | 10 | 27 | 0 | 29 | 20 | 52 | 1 | 50 | 35 | 77 | 4 | 3 | 55 |
| 3 | 0 | 0 | 20 | 28 | 0 | 31 | 35 | 53 | 1 | 54 | 55 | 78 | 4 | 10 | 20 |
| 4 | 0 | 0 | 35 | 29 | 0 | 33 | 55 | 54 | 1 | 59 | 20 | 79 | 4 | 16 | 50 |
| 5 | 0 | 0 | 55 | 30 | 0 | 36 | 20 | 55 | 1 | 3 | 50 | 80 | 4 | 23 | 25 |
| 6 | 0 | 1 | 20 | 31 | 0 | 38 | 50 | 56 | 2 | 8 | 25 | 81 | 4 | 30 | 5 |
| 7 | 0 | 1 | 50 | 32 | 0 | 41 | 25 | 57 | 2 | 13 | 5 | 82 | 4 | 36 | 50 |
| 8 | 0 | 2 | 25 | 33 | 0 | 44 | 5 | 58 | 2 | 17 | 50 | 83 | 4 | 43 | 40 |
| 9 | 0 | 3 | 5 | 34 | 0 | 46 | 50 | 59 | 2 | 22 | 40 | 84 | 4 | 50 | 35 |
| 10 | 0 | 3 | 50 | 35 | 0 | 49 | 40 | 60 | 2 | 27 | 35 | 85 | 4 | 57 | 35 |
| 11 | 0 | 4 | 40 | 36 | 0 | 52 | 35 | 61 | 2 | 32 | 35 | 86 | 5 | 4 | 40 |
| 12 | 0 | 5 | 35 | 37 | 0 | 55 | 35 | 62 | 2 | 37 | 40 | 87 | 5 | 11 | 50 |
| 13 | 0 | 6 | 35 | 38 | 0 | 58 | 40 | 63 | 2 | 42 | 50 | 88 | 5 | 19 | 5 |
| 14 | 0 | 7 | 40 | 39 | 1 | 1 | 50 | 64 | 2 | 48 | 5 | 89 | 5 | 26 | 25 |
| 15 | 0 | 8 | 50 | 40 | 1 | 5 | 5 | 65 | 2 | 53 | 25 | 90 | 5 | 33 | 50 |
| 16 | 0 | 10 | 5 | 41 | 1 | 8 | 25 | 66 | 2 | 58 | 50 | 91 | 5 | 41 | 20 |
| 17 | 0 | 11 | 25 | 42 | 1 | 11 | 50 | 67 | 3 | 4 | 20 | 92 | 5 | 48 | 55 |
| 18 | 0 | 12 | 50 | 43 | 1 | 15 | 20 | 68 | 3 | 9 | 55 | 93 | 5 | 56 | 35 |
| 19 | 0 | 14 | 20 | 44 | 1 | 18 | 55 | 69 | 3 | 15 | 35 | 94 | 6 | 4 | 20 |
| 20 | 0 | 15 | 55 | 45 | 1 | 22 | 35 | 70 | 3 | 21 | 20 | 95 | 6 | 12 | 10 |
| 21 | 0 | 17 | 35 | 46 | 1 | 26 | 20 | 71 | 3 | 27 | 10 | 96 | 6 | 20 | 5 |
| 22 | 0 | 19 | 20 | 47 | 1 | 30 | 10 | 72 | 3 | 33 | 5 | 97 | 66 | 28 | 5 |
| 23 | 0 | 21 | 10 | 48 | 1 | 34 | 5 | 73 | 3 | 39 | 5 | 98 | 6 | 36 | 10 |
| 24 | 0 | 23 | 5 | 49 | 1 | 38 | 5 | 74 | 3 | 45 | 10 | 99 | 6 | 44 | 20 |
| 25 | 0 | 25 | 5 | 50 | 1 | 42 | 10 | 75 | 3 | 51 | 20 | 100 | 6 | 52 | 35 |

Figure 7:
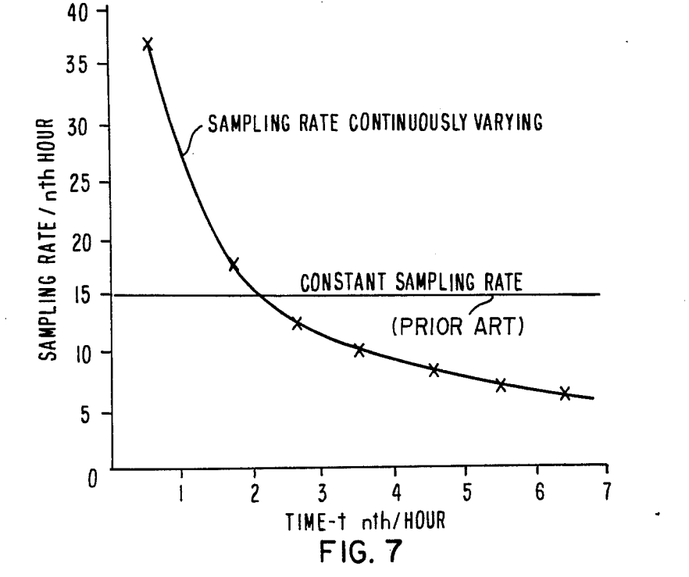

FIG. 7 shows the graph of the sampling rate with respect to time with the gauge of the present invention (Table 2) and that of the prior art. The graph for the gauge of the prior art is a straight line. However, the graph for the gauge of the present invention has a curve corresponding to the chart of the pressure of the well. Such a continuously varying sampling rate is preferred and, accordingly, drum D should have receive a movement in the initial period at a faster rate than in the final period and that the rate therebetween should be varying such that the graph of the sampling rate to time should be similar to that of the pressure to time and so as to match the reservoir behaviour.

Figure 8:
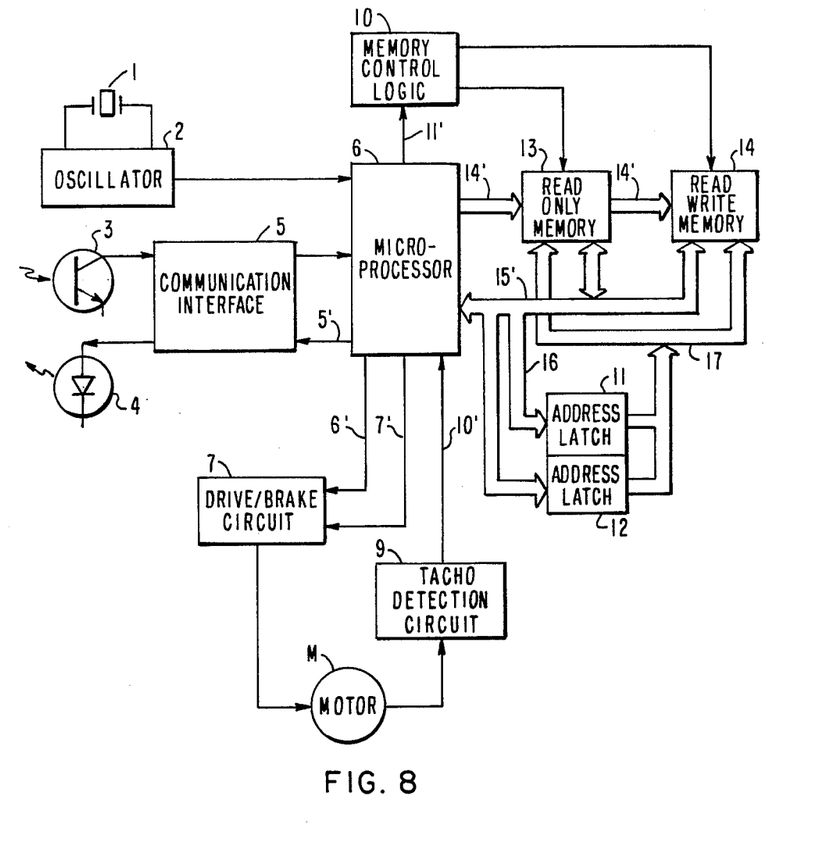
FIG. 8: shows the switch circuit of the present invention.

Reference is now made to FIG. 8. The oscillator clock 2 connected to the parallel resonating crystal 1 forces the latter to oscillate at its natural frequency. The sinusoidal oscillation thus derived is converted to digital level timing/clock pulses by oscillator 2 and is fed to the microprocessor 6 (MI of FIG. 5) through conductor 1'. The programs which control the system are stored in the non volatile read only memory 13 and executed by the microprocessor 6 on receiving the clock pulses. On starting of microprocessor 6, the program forces it to to wait for sampling control data from the programmer (external). The sampling control data consists of the initial delay, dwell time, drive time, drive span and member of samples to be taken. This is effected by the programmer flashing the corresponding codes to phototransistor 3, which generates pulses at conductor 2' and sensed by communication interface 5 which shapes and converts the pulses to digital level and feeds to the microprocessor 6 through input 3', which is stored finally in the Read Write Memory 14. Communication by the microprocessor 6 to and from the memories 13 and 14 is effected through the address bus 14' and address-/data bus 15'. The address/data bus 15' is demultiplexed and latched, thus separating the address bytes by Address latches 11 and 12 and fed to the memories 13 and 14 through demultiplexed address bus 17'. The memory control logic 10 derives memory control signals 11' from the microprocessor 6 and effects selection of either memories 13 or 14 during the execution of the control program.

Under program control the microprocessor 6 calculates the initial delay dwell and drive times (as member of clock pulses) for the sampling operation and waits for each of these event times to occur by keeping a watch of of its internal time. When the drive time occurs the microprocessor 6 gives the motor drive signal to the Motor drive or brake circuit 7 (MD of FIG. 5) which responds by switching power to the gear motor M. The rotation of the motor M is monitored by tacho detection circuit 9 (TD of FIG. 5) and generates tacho ouput pulses 10' which are digital level and are counted by the microprocessor 6. Each pulse 10' corresponds to an incrimental motor of the geared motor M thus definitely monitoring the special motor of the chart drum which it drives. Once the programmed number of pulses 10' are received (i.e. the chart has been moved through the desired span). The microprocessor 6 disables the motor drive signal 6' and enables the motor brake signal 7' which forces the motor drive/brake circuit 7 to connect the motor power to ground thereby braking the motor. The rotational energy of the rotor of the motor M is thus resistively dissipated and brought to a halt. Thus the microprocessor 6 executes the entire sampling process. Outward communication to the external programmer is achieved through LED 4. Output signal 5' is generated by the microprocess 6 and fed to communication interface 5 which translates these to current pulses 4' which drive the output LED 4.

I claim:

1. A sub surface recording gauge for measuring pressures in an oil well comprising an elongate housing having:
   (a) an axially displaceable drum with a chart, said drum being adapted for selective axial movement relative to and independent of the axial movement of said housing;
   (b) a rotatable stylus coacting with said drum;
   (c) a bourdon tube for imparting a rotatable movement to said stylus so as to cause pressure recordings at sub surface levels on said chart;
   (d) a motor adapted to be connected to a power source through a programmable switch, an output shaft of said motor imparting a selective drive to said drum.

2. A sub surface recording gauge as claimed in claim 1, wherein said drum is adapted for movement at predetermined and selected intervals of time by said programmable switch, the intervals of time being shorter in an initial recording period of movement of the drum than a final period of movement of the drum.

3. A sub surface recording gauge as claimed in claim 1, wherein said drum has a movement after selected and varying intervals of time.

4. A sub surface recording gauge as claimed in claim 3 wherein said drum has a sampling rate to time curve corresponding substantially to the pressure time curve of the oil well.

5. A sub surface recording gauge as claimed in claim 1 wherein said programmable switch comprises a microprocessor, signal means to feed a signal to said microprocessor, a motor drive circuit for receiving a signal from said microprocessor, a power source, and a tacho detection device connected between said motor and microprocessor.

6. A sub surface recording gauge as claimed in claim 5 wherein said motor drive circuit includes a brake circuit, a brake line connected between said microprocessor and motor drive circuit and such that upon presence of a signal in said line, the output terminals of the motor drive circuit are shorted.

7. A method of measuring and recording sub surface pressures on a drum provided with a recording chart by a rotatable stylus which receives a movement from a bourdon tube, said chart receiving a movement from a motor connected to a power source through a programmable switch so as to cause a movement of the chart only at selective periods, between predetermined dwell periods.

8. A method as claimed in claim 7 wherein the predetermined dwell period for an initial group of readings is shorter than for a final group of readings.

9. A method as claimed in claim 8 wherein the predetermined dwell period is continuously varying between the initial and final reading.

* * * * *